United States Patent
White et al.

(10) Patent No.: US 10,061,430 B2
(45) Date of Patent: Aug. 28, 2018

(54) TOUCH FORCE ESTIMATION

(71) Applicant: Synaptics Incorporated, San Jose, CA (US)

(72) Inventors: Michael White, San Jose, CA (US); Michael Comstock, Cupertino, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 15/257,969

(22) Filed: Sep. 7, 2016

(65) Prior Publication Data

US 2018/0067604 A1 Mar. 8, 2018

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0414* (2013.01); *G06F 2203/04104* (2013.01); *G06F 2203/04105* (2013.01); *G06F 2203/04108* (2013.01)

(58) Field of Classification Search
CPC ......... G06F 3/0414; G06F 2203/04104; G06F 2203/04105; G06F 2203/04106
See application file for complete search history.

(56) References Cited

U.S. PATENT DOCUMENTS

| | | | |
|---|---|---|---|
| 8,570,297 B2 | 10/2013 | Bulea et al. | |
| 2006/0279548 A1 | 12/2006 | Geaghan | |
| 2011/0227872 A1 | 9/2011 | Huska et al. | |
| 2012/0120017 A1 | 5/2012 | Worfolk et al. | |
| 2014/0035859 A1* | 2/2014 | Wilson | G01R 27/26 345/174 |
| 2015/0370396 A1* | 12/2015 | Hotelling | G06F 3/0414 345/174 |
| 2017/0038905 A1* | 2/2017 | Bijamov | G06F 3/0414 |

\* cited by examiner

*Primary Examiner* — Benjamin C Lee
*Assistant Examiner* — Dong Hui Liang
(74) *Attorney, Agent, or Firm* — Ferguson Braswell Fraser Kubasta PC

(57) ABSTRACT

A processing system for multiple input object force estimation includes sensor circuitry and processing circuitry. The sensor circuitry is configured to acquire measurements of a sensing region using sensor electrodes. The processing circuitry is connected to the sensor circuitry. The processing system is configured to obtain a delta image of the sensing region using the measurements, identify locations of the input objects in the sensing region using the delta image, and determine a force estimate for each input object using the delta image, a bending response model, and the plurality of locations. The processing system is further configured to perform an action based on the force estimate of each input object of the plurality of input objects.

17 Claims, 9 Drawing Sheets

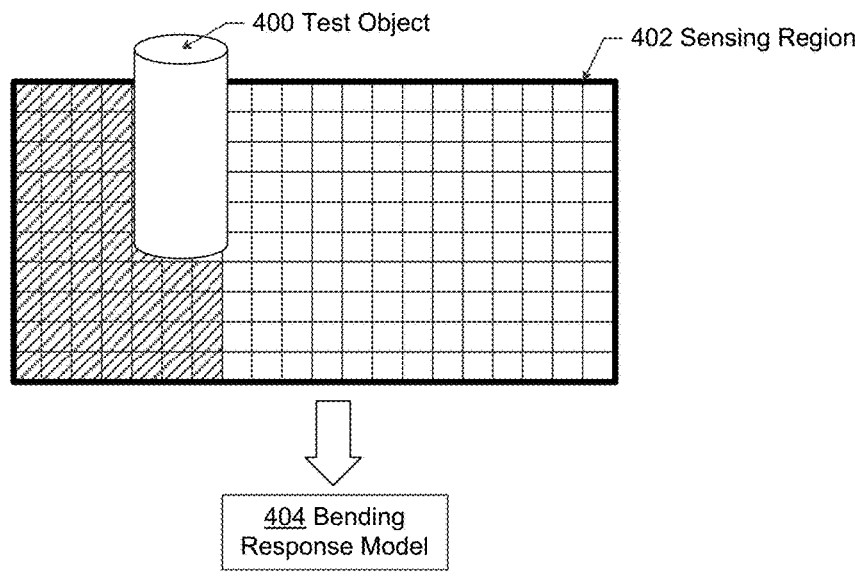
*FIG. 4.1*
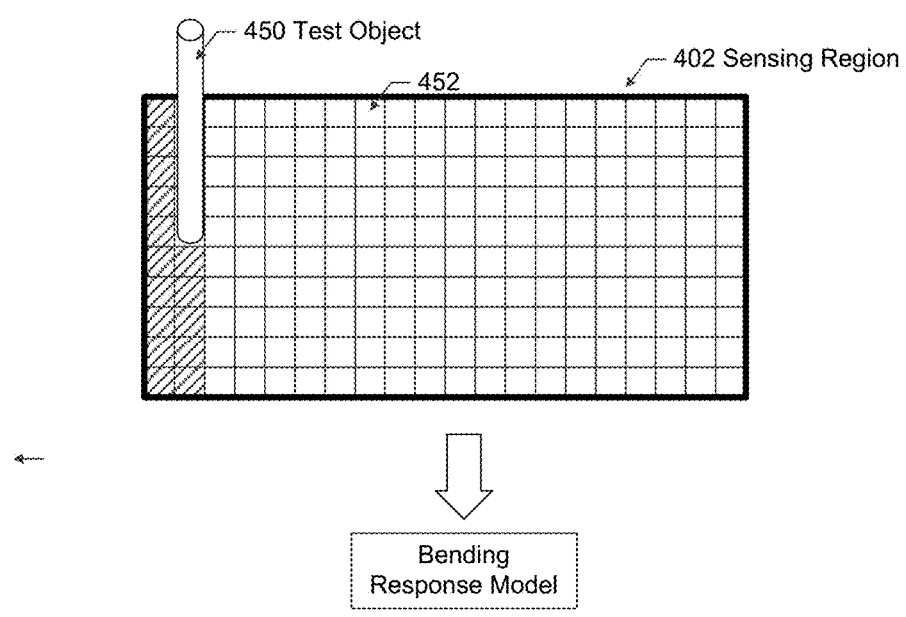
*FIG. 4.2*

TOUCH FORCE ESTIMATION

FIELD

This invention generally relates to electronic devices.

BACKGROUND

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, one or more embodiments relate to a processing system for multiple input object force estimation. The processing system includes sensor circuitry and processing circuitry. The sensor circuitry is configured to acquire measurements of a sensing region using sensor electrodes. The processing circuitry is connected to the sensor circuitry. The processing system is configured to obtain a delta image of the sensing region using the measurements, identify locations of the input objects in the sensing region using the delta image, and determine a force estimate for each input object using the delta image, a bending response model, and the plurality of locations. The processing system is further configured to perform an action based on the force estimate of each input object of the plurality of input objects.

In general, in one aspect, one or more embodiments relate to a method for multiple input object force estimation. The method includes obtaining a delta image of a sensing region using sensor electrodes, identifying locations of input objects in the sensing region using the delta image, and determining a force estimate for each input object using the delta image, a bending response model, and the plurality of locations. The method further includes performing an action based on the force estimate of each input object of the plurality of input objects.

In general, in one aspect, one or more embodiments relate to an input device for multiple input object force estimation. The input device includes sensor circuitry configured acquire measurements of a sensing region using sensor electrodes, and processing circuitry connected to the sensor circuitry. The processing circuitry is configured to obtain a delta image of the sensing region using measurements, identify locations of input objects in the sensing region using the delta image, and determine a force estimate for each input object using the delta image, a bending response model, and the locations. The processing circuitry is further configured to perform an action based on the force estimate of each input object.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements, and:

FIGS. 3, 4.1, and 4.2 are example diagrams in accordance with one or more embodiments of the invention;

DETAILED DESCRIPTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present invention provide input devices and methods that facilitate improved usability.

Figure 1:
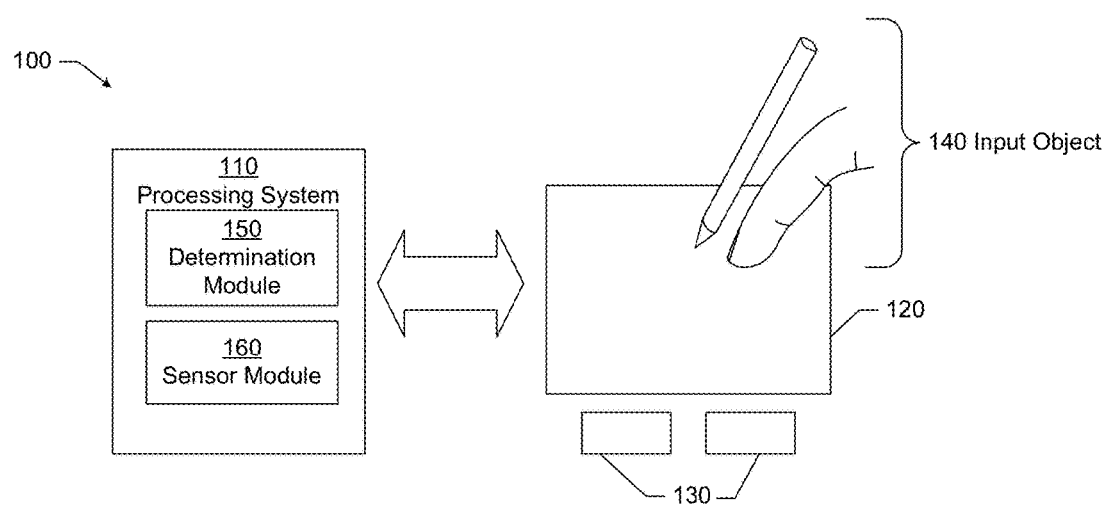
FIGS. 1 and 2 are a block diagram of an example system that includes an input device in accordance with an embodiment of the invention.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include an input device and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones) and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system or may be physically separate from the electronic system. Further, portions of the input device (100) may be part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects may exist in the sensing region (120). Further, which particular input objects are in the sensing region may change over the course of one or more gestures. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground) and by detecting the capacitive coupling between the sensor electrodes and input objects. The reference voltage may be a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and, in various embodiments, the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. For example, a processing system for a mutual capacitance sensor device may include transmitter circuitry configured to transmit signals with transmitter sensor electrodes and/or receiver circuitry configured to receive signals with receiver sensor electrodes. Further, a processing system for an absolute capacitance sensor device may include driver circuitry configured to drive absolute capacitance signals onto sensor electrodes and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components being close to the sensing element(s) of the input device (100) and one or more components being elsewhere. For example, the input device (100) may be a peripheral coupled to a computing device, and the processing system (110) may include software configured to run on a central processing unit of the computing device and on one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120) or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

It should be understood that while many embodiments of the invention are described in the context of a fully-functioning apparatus, the mechanisms of the present invention are capable of being distributed as a program product (e.g., software) in a variety of forms. For example, the mechanisms of the present invention may be implemented and distributed as a software program on information-bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processors, associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Figure 2:
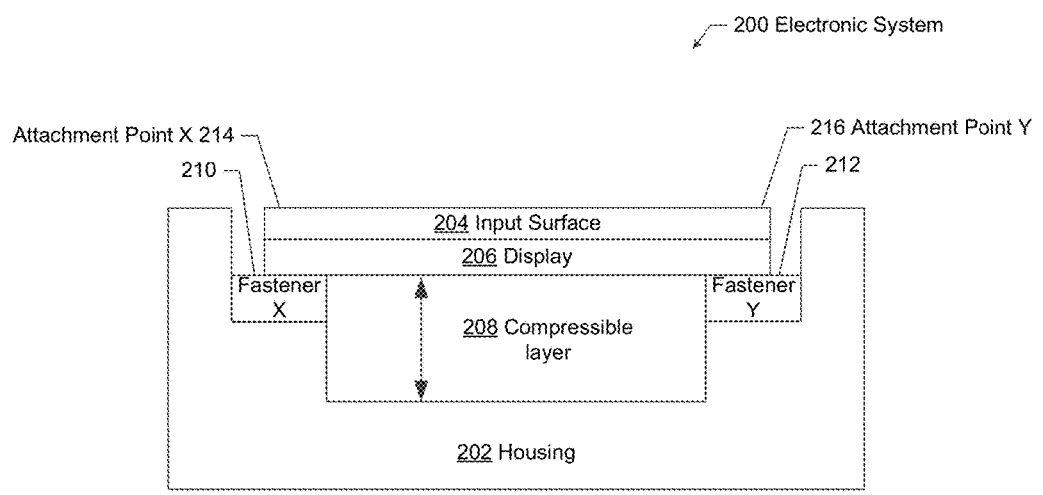

FIG. 2 shows a block diagram of an example system in accordance with one or more embodiments of the invention. In particular, FIG. 2 shows a cross section view of an electronic system (200) having an input device in accordance with one or more embodiments of the invention. The electronic system may be a smart phone, a tablet computing device, a touchscreen, a computing device with a touchpad, or other device. As shown in FIG. 2, the electronic system (200) includes at least a housing (202) and an input device. The electronic system (200) may include additional components, such as a central processing unit, memory, controllers, and other components that are not shown.

The housing (202) may be metal, plastic, other material, or a combination of materials. The housing (202) may be referred to as the frame of the electronic system (200) and may hold the input device.

The input device includes an input surface (204), a display (206), and a compressible layer (208). The input surface (204) is the surface of the input device that may be touched by an input object. For example, the input surface (204) may be glass or other material. The display (206) is a physical device that is configured to present visual information to a user. The input surface (204) and display (206) have bending properties that define the amount of bending by the input surface (204) and display (206) in response to force at various locations along the input surface. In other words, the bending properties of the input surface (204) and display (206) refer to the amount of bend of the input surface (204) and display (206) when subjected to an external force onto the input surface (204) and display (206). The input surface (204) and display (206) may be treated as having single bending properties or individual bending properties. Although FIG. 2 shows a distinct input surface (204) and display (206), the input surface may be an uppermost part of the display.

One or more fasteners (e.g., fastener X (210), fastener Y (212)) may connect the input surface (204) and the display (206) to the housing (202) at attachment points (e.g., attachment point X (214), attachment point Y (216)). For example, the fastener may be an adhesive (e.g., weld, solder, cement, glue), crimping, a mounting bracket or other hardware connector, or other type of fastener. The attachment points (e.g., attachment point X (214), attachment point Y (216)) are the points at which the fastener connects the input surface (204) and display (206) to the housing (202). For example, the attachment points may be around the edges of the input surface and/or the display. Other attachment points may exist without departing from the scope of the invention. The fastener may affect the bending properties of the of the input surface (204) and display (206). In other words, the amount of bend may change depending on the type of fastener used and the location of the attachment points. The bending properties are discussed in additional detail with reference to FIG. 3.

Continuing with FIG. 2, the compressible layer (208) is a layer of the input device that is configured to compress at least vertically in response to force applied to the input surface (204). In particular, the compressible layer may include one or more compressible materials. For example, the compressible layer (208) may include foam, air gap, rubber, or other compressible material.

Continuing with FIG. 2, the input device may further include sensor electrodes (not shown). The sensor electrodes may include one or more touch electrodes and one or more force electrodes. The touch electrodes are configured to detect the presence of input object on or above the input surface. In other words, if the sensor electrodes are capacitive electrodes, the capacitance measured using the touch electrodes is affected by the presence of at least one input object. The force electrodes are electrodes that are configured to sense the amount of force applied by at least one input object. For example, the capacitance measured by the force electrode is affected by the amount of force applied by an input object on the input surface. The force electrodes may be the same electrodes as the touch electrodes. Further, the force and/or touch electrodes may be the same electrodes used for the display updating.

In one or more embodiments of the invention, the capacitance measured by the force electrode(s) is affected by the amount of vertical compression of the compressible layer. In other words, a force electrode measures the amount of compression response of the compressible layer. The compression response may also be referred to as the conductive response, which is provided by the compression of the compressible layer. Various force sensing technologies having various configurations of force electrodes may be used. For example, the force sensing may be based on mutual capacitance or absolute capacitance sensing. The force electrodes may be above, below, and/or in the middle of the compressible layer in accordance with one or more embodiments of the invention. The following are some examples of configurations of force electrodes.

By way of a first example, a force electrode may be above or within a top section of the compressible layer, and at least the section of the housing below the compressible layer may include conductive material. In the example, when the compressible layer is compressed and the force electrode is driven with a sensing signal, the resulting signal includes the effects of the decreased distance to the housing. A similar effect may be achieved by putting the one or more force electrodes within a lower section or underneath the compressible layer and having a conductive material above the compressible layer. By way of another example, a force electrode may be above the compressible layer and a force electrode may be below the compressible layer. In the example, mutual capacitive measurements acquired between the two electrodes identifies the distance between the two electrodes and thus the amount of compression of the compressible layer. Based on the amount of compression, a determination may be made as to the amount of force applied to the input surface. In general, almost any force sensing technology may be used in one or more embodiments of the invention.

Figure 3:
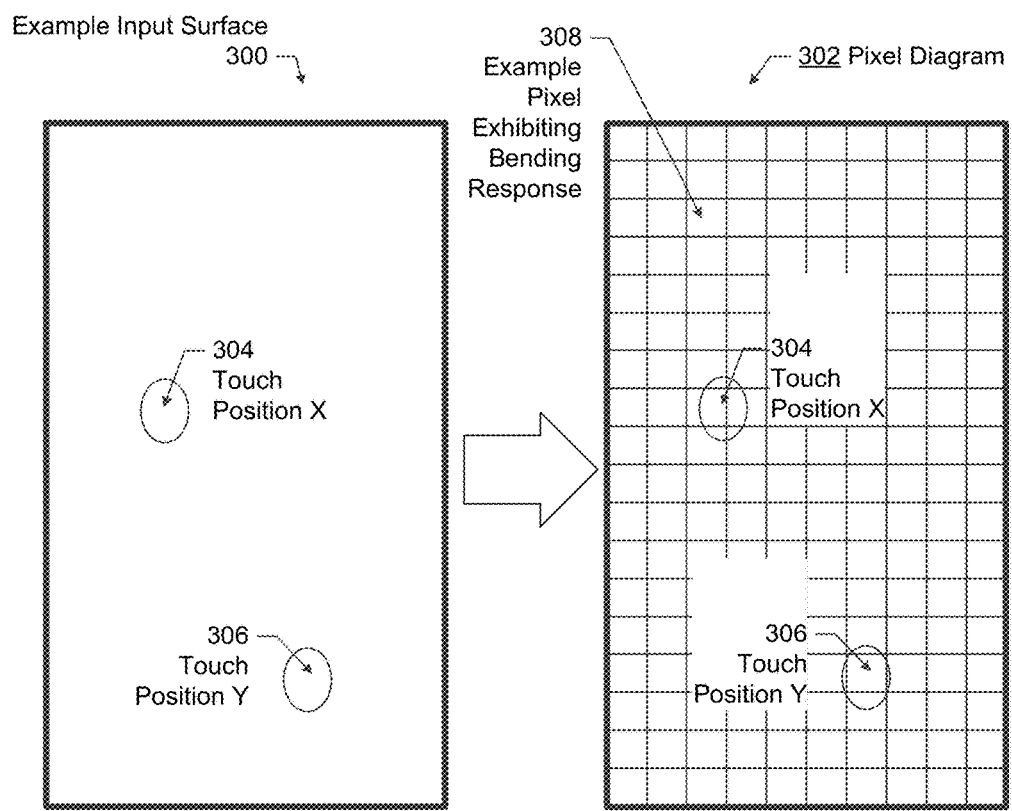

Turning to FIG. 3, FIG. 3 shows an example diagram in accordance with one or more embodiments of the invention. In particular, FIG. 3 shows a top down view of an example input surface (300) and corresponding pixel diagram (302). In the example, consider a scenario in which a user applies a first force to touch position X (304) and concurrently applies a second force to touch position Y (306). The first force and the second force may be the same magnitude or different magnitudes. The application of the force results in a bending of the input surface and display.

Because of the attachment of the input surface and the display to the housing, the amount of bending of the display at a location on the input surface is related to the distance from the attachment points to the location. For example, if the attachment points are around the edges of the input surface, then the input surface (300) may deflect less around the edges of the input surface (300) and deflect more towards the center of the input surface. In other words, the bending properties may radiate inward toward the middle, whereby less bending is around the edges and more bending occurs toward middle when an equal amount of force is applied. In some instances, where additional or different attachment point(s) exists or other effects exist, the bending properties are irregular. For example, the bending properties that are accounted for by a compressible layer may include the effects of apertures in the compressible layer to account for electrical and other connectors through the compressible layer that support the sensors and display.

The bending may cause sensor electrodes to move closer to each other in the case of mutual capacitive force sensing and/or cause sensor electrodes to move closer to conductive surfaces in the case of absolute capacitive sensing. Thus, a change in the measured capacitance is received. The sensor electrodes that measure force may be related to pixels. In other words, each pixel may have a corresponding raw measurement value for the pixel that is obtained using one or more sensor electrodes. In the example diagram of FIG. 3, a pixel is a square in the grid. However, a pixel may be triangular, or a different shape or may be non-uniform shapes without departing from the scope of the invention. Further, although FIG. 3 shows the input surface as having 180 pixels, more or fewer pixels may exist without departing from the scope of the invention. For example, in some implementations, only nine pixels may exist.

As shown in the example pixel diagram (302), when force is applied at touch position X (304) and touch position Y (306), measurements are acquired for each pixel of the sensing region. In particular, each location of the sensing region may have a corresponding bending response to the force at the touch positions. For example, in response to the force at touch position X (304) and touch position Y (306), a bending response is exhibited at example pixel (308). The variation in bending response based on the configuration of the electronic system may result in the example pixel (308) having a greater bending response than the touch positions. In other words, the delta image, or sensing image generated by scanning the sensing region and having the baseline removed, may have a greater value in some force configurations at example pixel (308) than the pixels under the touch position. Further, even if a greater amount of force is applied to touch position Y (306) than touch position X (304), touch position Y (306) may have a lower bending response than touch position X (304) resulting in a lower value in the delta image.

One or more embodiments are directed to generating an estimation of force separately for each input object using the delta image and calibration data gathered for pixels of the sensing region. In other words, one or more embodiments generate an individual estimation of the force applied by each input object of multiple input objects that are concurrently on the sensing region. In the example of FIG. 3, one or more embodiments generate a force value for touch position X (304) that is an estimate of the force applied to touch position X (304) and a separate force value for touch position Y (306) that is an estimate of the force applied to touch position Y (306). To generate the estimate, one or more embodiments use calibration data generated by a single input object being in the sensing region when the calibration data is obtained.

FIGS. 4.1 and 4.2 shows example diagrams for obtaining calibration data in accordance with one or more embodiments of the invention. In FIG. 4.1, a test object (400) is placed on the sensing region (402) with a force applied. The test object is an input object used for calibration. For example, the test object may be a slug. The amount of force is pre-defined in one or more embodiments. In one or more embodiments, the test object is approximately the same size as an average finger. For example, the finger size may be an average adult finger within a defined confidence interval. By way of a more specific example, the test object may be around 1.6 to 2 centimeters, with a degree of variability applied.

For calibration, the test object (400) is placed at a position on the sensing region (402), and a model force image (not shown) of the sensing region is acquired. The test object is moved to a new position, and a new model force image is acquired. Thus, for calibration, multiple model force images are acquired for each of the multiple positions. The shaded pixels in FIG. 4.1 correspond to positions in which the test object is placed and a model force image obtained. In the embodiment shown, the test object is placed at each position of the sensing region and a model force image is acquired for each position. Further, in the embodiment shown, the positions are overlapping. In some embodiments, the positions are non-overlapping during calibration. In some embodiments, the positions in which the test objects are placed and the model force image acquired are separated by a certain distance. By way of an example, the test object may be placed in six positions of the sensing region shown in FIG. 4.1 rather than all of the positions of the sensing region. Thus, at least some of the positions may not have a test object placed on the position. In such a scenario, linear interpolation may be used to interpolate the model force image during runtime when a test object is placed in a position in which the model force image does not exist.

The model force image is an image of the sensing region that has a value for each pixel of the sensing region. In one or more embodiments, the model force image is a delta image. Additionally, or alternatively, the model force image may be normalized based on the amount of force applied with the test object.

The combination of model force images form a bending response model (404). In other words, the bending response model (404) includes model force images for different positions of the sensing region in which a test object (400) is placed, whereby each model force image includes a value for each pixel of the sensing region.

Turning to FIG. 4.2, rather than a finger size test object, the test object (450) is one cell size. A cell (e.g., example cell (452)) is a partition of the sensing region. In other words, the surface sensing region (402) is partitioned into a defined number of cells. In the example shown in FIG. 4.2, the cell is a pixel size, whereby each pixel is smaller than the size of a finger. In some embodiments, the number of cells is greater than the number of pixels. For example, the number of force pixels may be nine and the number of cells may be forty-five. In some embodiments, the number of cells is greater than the number of pixels. In other words, the size of the electrodes and cells may be independent of the cells. Using the cell-sized test object (450), a similar calibration as described above with reference to FIG. 4.1 may be performed.

While FIGS. 1, 2, 3, 4.1 and 4.2 show a configuration of components, other configurations may be used without departing from the scope of the invention. For example, various components may be combined to create a single component. As another example, the functionality performed by a single component may be performed by two or more components. Further, the various configurations disclosed herein may be combined in virtually any contemplated manner.

Figure 5:
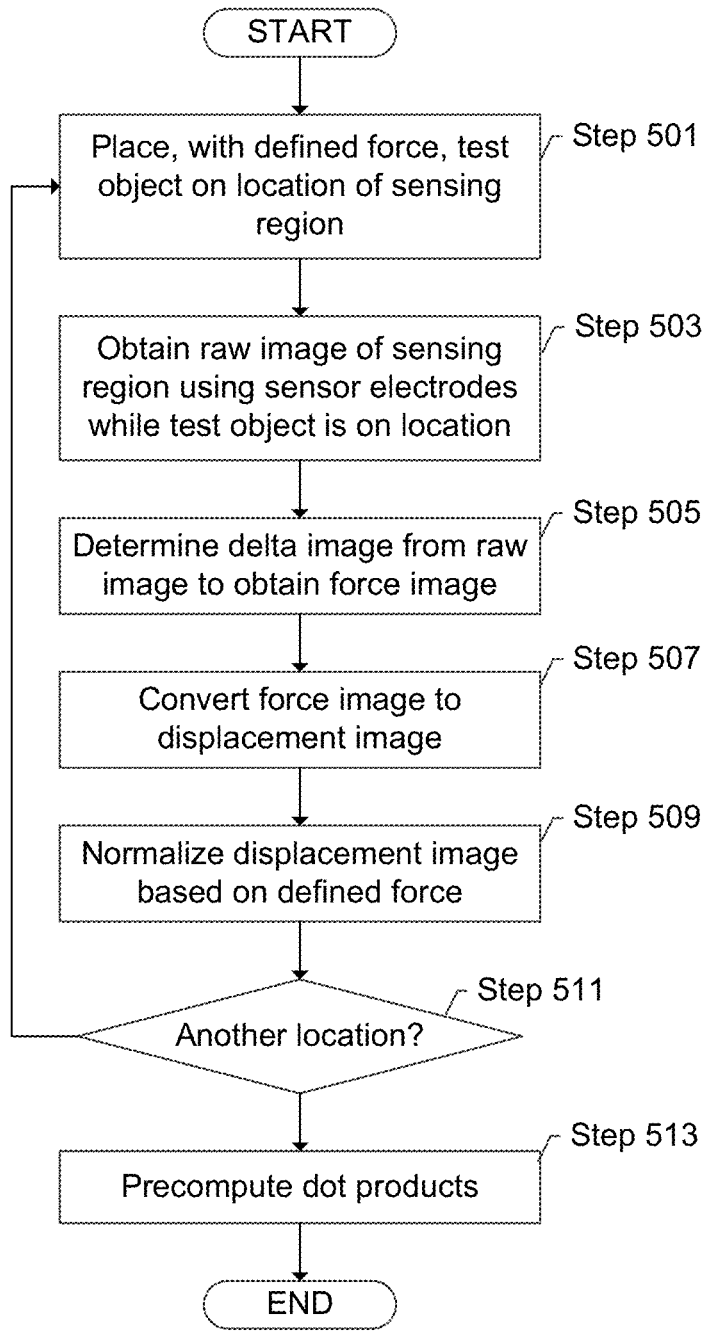
FIGS. 5, 6, and 7 are example flowcharts in accordance with one or more embodiments of the invention.
Figure 6:
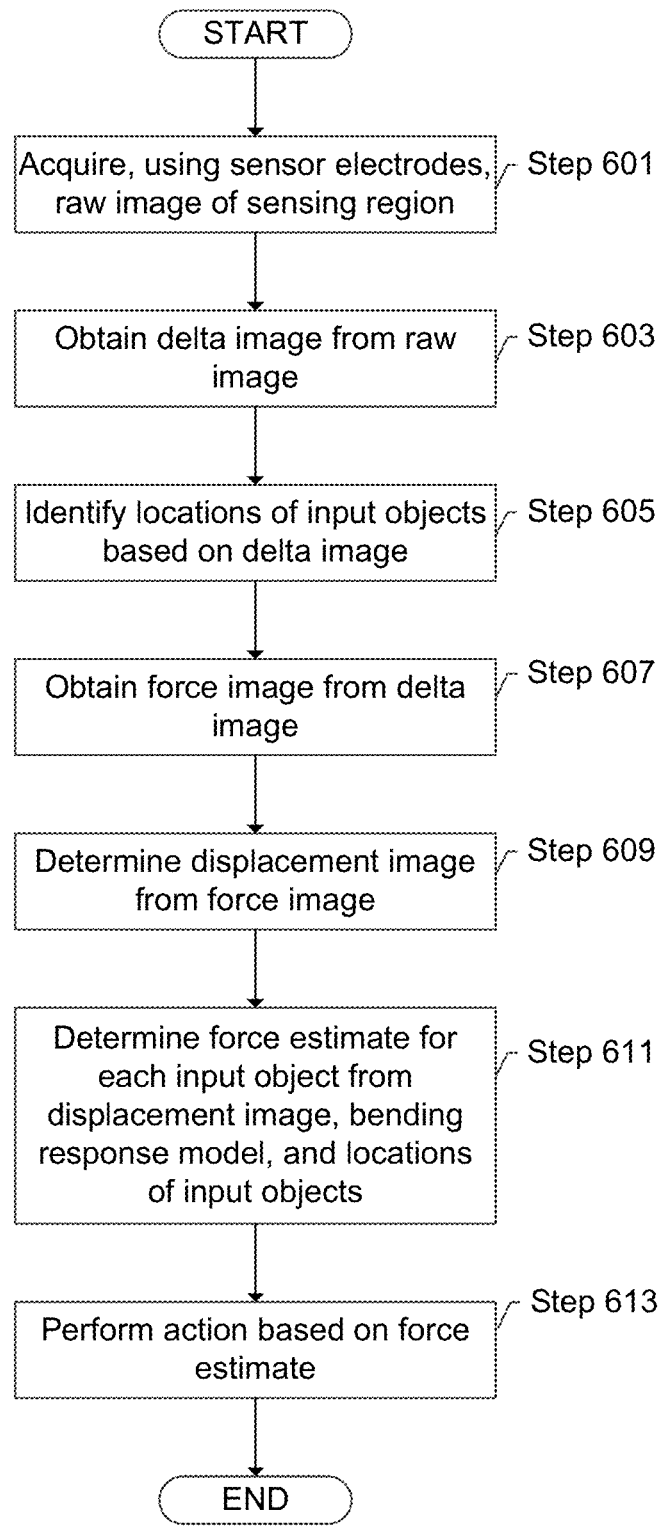
Figure 7:
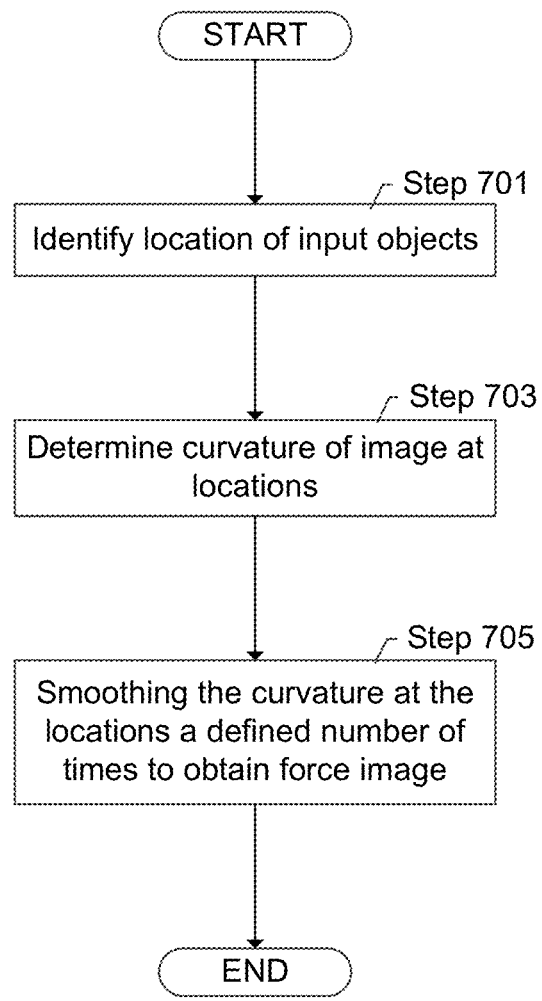

FIGS. 5, 6, and 7 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

In Step 501, a test object is placed on a location of the sensing region with a defined force in accordance with one or more embodiments of the invention. In other words, the test object is applied to the sensing region with a defined amount force exerted in a defined direction on the sensing region. In one or more embodiments, the direction of the force is perpendicular to the plane of the sensing region. The amount of force is defined in that the amount of force is a fixed value. For example, a robot may exert a slug on the sensing region with a defined amount of force. By way of another example, the test object having a known weight may be placed on the sensing region, such that the force is caused by gravity of the test object. Other mechanisms may be used without departing from the scope of the invention.

In Step 503, a raw image of the sensing region is obtained while the test object is on the location in accordance with one or more embodiments of the invention. In one or more embodiments, the raw image is from absolute and/or mutual capacitive measurements of the sensing region. Absolute capacitance or self capacitance is determined by determining the amount of electric charge is added to a sensor electrode to increase the electric potential of the sensor electrode by one unit. In one or more embodiments of the invention, the amount of electric potential is affected by the distance to the housing and, subsequently, the compression of the compressible layer as affected by force. To determine the absolute capacitance, the sensor electrodes are driven with a modulated sensing signal to determine the amount of electric charge. Measurements at each sensor electrode are obtained. For example, the measurements may be obtained at once or at different times. Mutual capacitance measurements may be obtained by transmitting with a transmitter electrode (e.g., a sensor electrode) a transmitter signal. Resulting signals are received using another sensor electrode, which is the receiver electrode. In one or more embodiments of the invention, the resulting signals are affected by the distance between the transmitter electrode and receiver electrode and, subsequently, the compression of the compressible layer as affected by force. Regardless of whether mutual capacitive measurements or absolute capacitive measurements are used, the measurements may be combined into a raw image.

In Step 505, a delta image is determined from the raw image to obtain a force image in accordance with one or more embodiments of the invention. The delta image is the measurements of the raw image that accounts for the baseline. In other words, the delta image is the raw image with the background capacitance and the noise removed. Determining the delta image may be performed, for example, by subtracting values in the baseline from corresponding values in the raw image. If the delta image includes touch as well as force information, additional steps may be performed to obtain a force image from the delta image. For example, the steps of FIG. 7 may be performed to perform the conversion. In some embodiments, the test object is a non-conductive material, such as wood. Thus, even though the sensor electrodes may be arranged to obtain both touch and force information in a single image, the delta image acquired may be a force image because the mere touch of the non-conductive material is not reflected in the image.

In Step 507, the force image is converted to a displacement image in accordance with one or more embodiments of the invention. For example, the delta values in the delta image may be converted to displacement values using a parallel plate capacitance formula and some assumptions about the sensor stack-up of the sensor electrodes and compressible layer in the electronic system. The conversion may be based on the area of the electrode, the dielectric constants of the layers under the display, the thickness of the display, the thickness of the compressible layer, and the partial force at the location at which the conversion is being performed. Other techniques for performing the conversion may be used without departing from the scope of the invention.

Further, in some embodiments, no conversion is performed. For example, calibration and runtime may use the force image directly without converting to a displacement image. In such a scenario, the discussion below with respect to displacement image may be performed using the force image or delta image.

In Step 509, the displacement image is normalized based on the defined force in accordance with one or more embodiments of the invention. In one or more embodiments normalizing the displacement image includes dividing the displacement image by the defined force value. In one or more embodiments, the normalizing the image is performed by dividing each value in the image by the square root of the sum of the squares of the pixel values in the image. In such embodiments, the norm of the image is one.

In Step 511, a determination is made whether another location exists to place the test object. In particular, a determination is made whether to move the test input object to a new location and get additional calibration data. In one or more embodiments, the number of positions is dependent on the amount of acceptable error as well as the amount of storage for data. In particular, each position results in storage of calibration data as well as a reduction in error for determining force. The positions and number of positions may be predefined as a configuration parameters based on the storage and error requirements. If a determination is made to use another location, the process repeats starting with Step 501.

Continuing with FIG. 5, in Step 513, dot products are precomputed in accordance with one or more embodiments of the invention. In some embodiments, dot products between each pair of delta images are precomputed and the precomputed dot products are stored. By way of an example, consider the following, vector $a_i$ is the flattened image when the test object is at position i, and vector $a_j$ is the flattened image when the test object is at position j. A flattened image is a two dimensional image that is converted into a one dimensional vector, without loss of information. For example, each row may be successively stored in a one dimensional vector (e.g., $p_{0,0}, \ldots, p_{0,n}, p_{1,0} \ldots, p_{1,n}, p_{2,0}, \ldots, p_{2,n}, \ldots, p_{m,0}, \ldots p_{m,n}$), where $p_{i,j}$ is the value of the pixel at position row i, column j. Rather than row order, the vector may be column order. The dot product is the inner product of the two vectors. In one or more embodiments, the dot product of each pair of vectors is maintained. The bending response model may include the pre-computed dot products and/or the vectors.

In some embodiments, rather than creating dot products, the calibration data is stored directly. For example, the bending response model that is used at runtime may include the displacement image and/or normalized delta image for each location of the test object. In some embodiments, the bending response model is a single two dimensional matrix. Each column of the two dimensional matrix may be the flattened image discussed above when the test object is at a particular position. For example, column 1 of the matrix may correspond to the flattened image when the test object is at position 1, column 2 is the flattened image is at position 2, etc.

Although the above is discussed with respect to vectors and matrices, virtually any data structure may be used. In particular, one or more embodiments of the invention are not limited to any particular data structure.

Using the calibration data, per input object force estimation may be performed. FIG. 6 shows a flowchart for estimating force during runtime in accordance with one or more embodiments of the invention. In Step 601, using sensor electrodes, a raw image of the sensing region is acquired. Acquiring a raw image of the sensing region may be performed using capacitive sensing, such as using the method discussed above with reference to Step 503.

In Step 603, a delta image is obtained from the raw image in accordance with one or more embodiments of the invention. In one or more embodiments, obtaining the delta image may be performed as discussed above in reference to Step 505. In some embodiments, the delta image obtained in Step 603 includes a single image that has both force and positional information. For example, where the same sensor electrodes are arranged to simultaneously detect force and positional information, a single measurement may reflect both a presence of an input object at a particular position as well as the force applied by the input object. In some embodiments, the delta image includes at least two separate images, a positional image and a force image. For example, sensor electrodes that detect positional information may be at least partially different than the sensor electrodes that detect force information.

In Step 605, locations of the input objects in the sensing region are determined based on the delta image. In other words, the delta image is processed to identify the locations. For example, if the delta image is a single image with both force and positional information, the single image may be processed to identify portions of the image having peak values satisfying a threshold. For example, a determination may be made as to which portions of the delta image are greater than a threshold. If the delta image is a separate positional image, then the positional image is processed to identify the portions of the positional image satisfying the threshold. Various processing techniques may be applied to process the delta image and identify the locations of the input object.

In Step 607, a force image is obtained from the delta image in accordance with one or more embodiments of the invention. If the delta image has a separate force image than positional image, then obtaining the force image is to identify the force image. If the delta image includes a single image that has both information, then processing is performed on the single image to remove the effects of the presence of the input object. For example, the processing may be to apply a smoothing method, such as described below with reference to FIG. 7. By way of another example, the processing may be to apply a least squares fit and remove outliers which correspond to the input objects as part of performing Step 611 discussed below.

In Step 609, the displacement image is determined from the force image in accordance with one or more embodiments of the invention. Determining the displacement image from the force image may be performed as discussed above with reference to Step 507 of FIG. 5. Further, as discussed above, in some embodiments, the conversion is not performed.

In Step 611, a force estimate is determined for each input object from the displacement image, the bending response model, and the locations of the input object in accordance with one or more embodiments of the invention. In general, the force estimate is determined by using the locations of the input objects to identify the calibration information in the bending response model. A dot product is performed on the runtime image (e.g., force image) with the calibration data and a linear solve is performed using the dot product to obtain an estimation of force for each separate input object. The performing the linear solve may be a linear least squares fit of the flattened model force images for each input object to the current flattened displacement image. One or more embodiments, therefore, attribute certain portions of the force to particular input objects such that each input object has a separate estimate of force. In other words, the separate estimate may be different for each input object. Below are more particular methods for determining the force estimate.

One technique is to use the locations of the input objects to identify the corresponding model force images that are obtained when an input object is at the respective locations. If a model force image for a particular location does not exist, an approximation may be performed using existing model force images to estimate a model force image for the location touched. Further, a dot product of the model force images is performed, if such a precomputed dot product does not exist. A linear solve is performed to determine the force. In the example technique, the following matrix equation (Eq. 1) may be used.

$$\begin{bmatrix} (\vec{a}_1 \cdot \vec{a}_1) & \cdots & (\vec{a}_1 \cdot \vec{a}_m) \\ \vdots & \ddots & \vdots \\ (\vec{a}_1 \cdot \vec{a}_m) & \cdots & (\vec{a}_m \cdot \vec{a}_m) \end{bmatrix} \begin{bmatrix} x_1 \\ \vdots \\ x_m \end{bmatrix} = \begin{bmatrix} \vec{a}_1 \cdot \vec{b} \\ \vdots \\ \vec{a}_m \cdot \vec{b} \end{bmatrix} \quad \text{(Eq. 1)}$$

In Eq. 1, $\vec{a}_i$ is a flattened model force image for the ith input object, whereby the flattened model force image matches the position of the ith input object at position i. Thus, $\vec{a}_1$ is the flattened model force image for the first input object. $x_i$ is the estimate of force for the ith test input object. $\vec{b}$ is the runtime force image determined in Step 609 or 607, depending on whether the displacement image is used.

Another technique uses the cell size location information. In such a scenario, a matrix W may be created that is the combination of model force images. For example, each column of W may be a flattened model force image for an input object at particular position. In the example, the ith column of W is the flattened model force image obtained for when the input object is at position i. The location of the input objects may be specified in a sparse matrix P, whereby P is an m,n matrix having m*n entries. In matrix P, if the input object is at the location represented by a particular entry, then the particular entry is marked with a 1, otherwise, the entry is marked with a 0. Thus, if the input object spans multiple consecutive entries, then each of the consecutive entries may be marked with a 1. Multiplying W*P yields a matrix having only the calibrated force information for only the positions in which the input objects are located. The following Eq. 2 is an example equation for estimating force using matrices W and P.

$$(P^T W^T W P)\vec{x} = P^T W^T \vec{b} \quad \text{(Eq. 2)}$$

In Eq. 2, $P^T$ is the transpose of matrix P and $W^T$ is the transpose of matrix W. $\vec{x}$ is a force vector that includes an estimation of force for each input object position, and $\vec{b}$ is the measured force image that is obtained in Step 609 or 607. For example, the Jacobi method may be used to obtain $\vec{x}$. Other techniques and optimizations may be performed to determine $\vec{x}$ during runtime. Such techniques may be based, for example, on P being a sparse matrix. In this second technique, conceptually Eq. 1 may be used with the following change. Instead of reading each flattened model force image $\vec{a}_i$ from memory based on the position of each input object, a more customized flattened model force image $\vec{a}_i$ is dynamically generated for each input object by combining the flattened model force images obtained using the procedure described with reference to FIG. 4.1. For example, $\vec{a}_i = W\vec{p}_i$ may be computed, where W is the matrix described above, and $\vec{p}_i$ is the ith column of the matrix P described above. The matrix-vector product $W\vec{p}_i$ is equal to a linear combination of the columns of matrix W. The linear combination is an approximation of the flattened force image corresponding to an object which covers the grid cells corresponding to the 1s in $\vec{p}_i$. Then, Eq. 1 may be solved as usual to obtain force estimates.

In other words, for the second technique described above, for each input object on the sensing surface, the sum over each pixel under the input object is performed, and the corresponding bending responses are combined to create a predicted shape of the displacement caused by the input object. Then, the predicted shapes are linearly combined to fit the measured displacement, and the coefficients from this linear combination are the estimated forces for each input object.

As discussed above, when the force image is combined with the positional image, the processing may be to apply a least squares fit and remove outliers as part of performing Step 611. In particular, a linear system of Eq. 1 is equivalent to a linear least squares fit. If A is the matrix with columns $\vec{a}_i$, then Eq. 1 is equivalent to the following Equation 3.

$$(A^T A)\vec{x} = A^T \vec{b} \quad \text{(Eq. 3)}$$

To apply a least squares fit and remove outliers, a weighted least squares fit may be performed by solving the following Equation 4.

$$(A^T Q A)\vec{x} = A^T Q \vec{b} \quad \text{(Eq. 4)}$$

In Eq. 4, Q has diagonal entries $$q_{ii} = \frac{1}{(b_i - (A\vec{x})_i)^2},$$

where $b_i$ is the ith element of vector $\vec{b}$, and $(A\vec{x})_i$ is the ith element of the vector formed by the product of the matrix A and the force vector $\vec{x}$ calculated during the previous frame.

In Step 613, an action is performed based on the force estimate in accordance with one or more embodiments of the invention. For example, the action may be to send a report to the host device of the force on each input object. In some embodiments, the action is a GUI action, such as to display data or perform another action. In some embodiments, the action is to determine to ignore a first input object that is estimated as having less than a threshold amount of force when a second input object has more than a threshold amount of force, where the thresholds may be the same or different. Ignoring may be to drop or disregard positional and/or force information for the ignored input object. Other actions may be performed without departing from the scope of embodiments described herein.

Turning to FIG. 7, FIG. 7 shows a flowchart for obtaining a force image from a single image that has both positional information and force information. In Step 701, locations of the input objects are determined. Determining the locations of the input objects may be performed as discussed above with reference to Step 605 of FIG. 6.

In Step 703, the curvature of the image at the locations is determined in accordance with one or more embodiments of the invention. In one or more embodiments, the curvature is obtained by obtaining the two dimensional second derivative, or the Laplacian, of the image. The second derivative is negative at the location of the input objects. Notably, the locations of the input objects may be determined as part of determining Step 703 based on the negative aspect of the second derivative.

In Step 705, the curvature is smoothed at the locations a defined number of times to obtain the force image. For example, Euler's method may be applied to simulate anisotropic diffusion in order to selectively smooth away the peaks caused by input objects. The pixels underneath the input objects are forced to have a curvature that is around the respective input objects, without having the curvature of the input objects. Thus, the force effects reflected in the image may be separated from the touch portion of the effects in the image without having the touch signal pollute the force signal.

Figure 8:
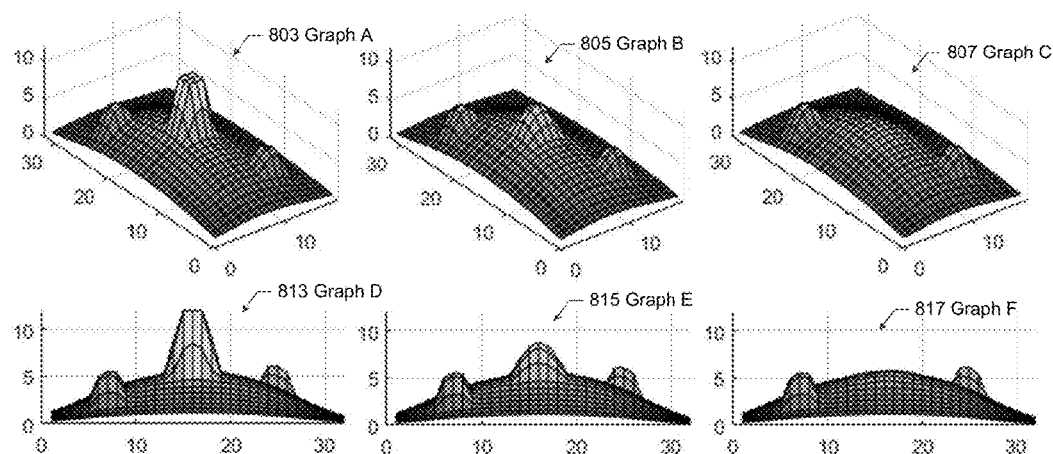
FIGS. 8 and 9 are example graphs in accordance with one or more embodiments of the invention.
Figure 9:
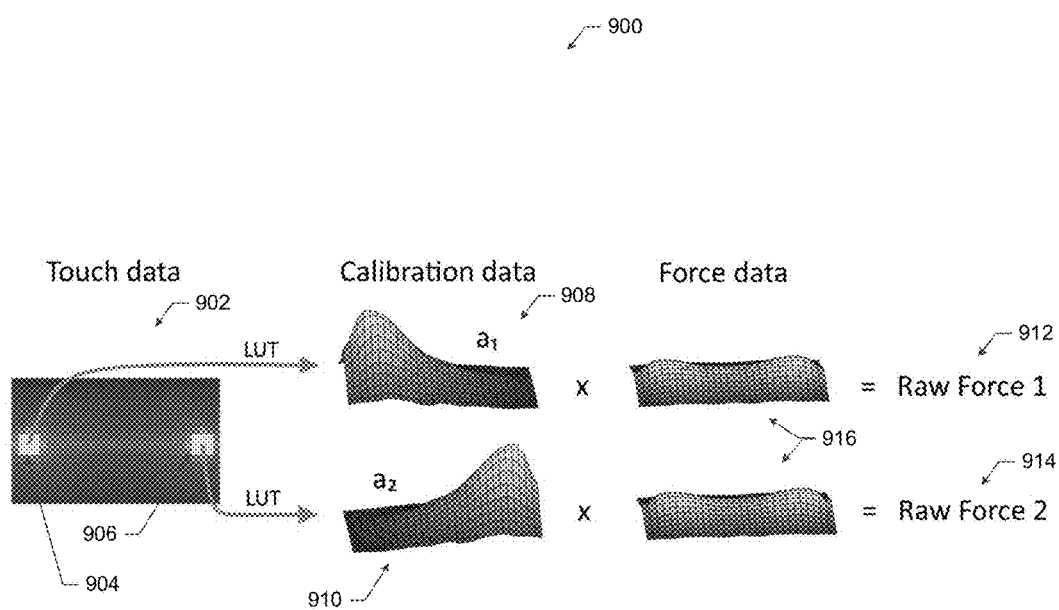

FIGS. 8 and 9 show examples in accordance with one or more embodiments of the invention. The following example is for explanatory purposes only and not intended to limit the scope of the invention.

FIG. 8 shows an example for smoothing the curvature of the input object. In particular, graph A (803), graph B (805), and graph C (807) are top perspective views of the graph of the image at time t1, t2, and t3, respectively. Graph D (813), graph E (815), and graph F (817) are side views of the graph of the image at time t1, t2, and t3, respectively. As shown in graph A (803) and graph D (813) of FIG. 8, at time t1, the curvature of the central input object is large. Smoothing is performed on the middle input object of the graph to create graph B (805) and graph E (815) at time t2. Thus, the curvature of the middle input object position remains in time t2, but the middle input object is not as pronounced as at time t1. Smoothing is further performed on the middle input object of the graph to create graph C (807) and graph F (817) at time t3. Thus, the curvature of the middle input object position is such that the middle input object disappears and only the effects of force remain. Accordingly, the force image may be processed to determine the amount of force for each location of an input object.

FIG. 9 shows an example diagram (900) in accordance with one or more embodiments of the invention. As shown in FIG. 9, in the graph (902) of the image of touch data, two input objects are located at position X (904) and Y (906) on the sensing region. Based on the position of the input objects, model force images (e.g., calibration data) $a_1$ (908) and $a_2$ (910) are obtained. In particular, $a_1$ (908) is the model force image for an input object located at position X (904) and $a_2$ (910) is the model force image for an input object located at position Y (906). Continuing with FIG. 9, the model force images are multiplied by the runtime force image (916) to obtain raw force 1 (912) and raw force 2 (914). Raw force 1 (912) is the force of the input object at position X (904) and raw force 2 (914) is the force of the input object at position Y (906). Algebraically, determining the raw force may be performed by solving the following equation Eq. 5.

$$\begin{bmatrix} (\vec{a}_1 \cdot \vec{a}_1) & (\vec{a}_1 \cdot \vec{a}_2) \\ (\vec{a}_1 \cdot \vec{a}_2) & (\vec{a}_2 \cdot \vec{a}_2) \end{bmatrix} \begin{bmatrix} \vec{x}_1 \\ \vec{x}_2 \end{bmatrix} = \begin{bmatrix} \vec{a}_1 \cdot \vec{b} \\ \vec{a}_2 \cdot \vec{b} \end{bmatrix} \quad \text{(Eq. 5)}$$

Although FIG. 9 shows only two input objects, one or more embodiments may be used to obtain the force for any number of input objects. For example, the per input object force estimation may be obtained for ten input objects using the techniques described herein.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system for multiple touch input object force estimation, comprising:
  sensor circuitry configured to acquire a plurality of touch force measurements of a sensing region on a surface using a plurality of sensor electrodes, wherein the surface is characterized by a bending response model representative of a distribution of non-uniform bending coefficients;
  processing circuitry connected to the sensor circuitry and configured to:
    obtain a delta image of the sensing region using the plurality of touch force measurements;
    identify a plurality of touch locations of a plurality of touch input objects in the sensing region using the delta image;
    identify a plurality of flattened model force images using the plurality of touch locations of the plurality of touch input objects, wherein each flattened model force image of the plurality of flattened model force images is a one-dimensional vector corresponding to a respective two-dimensional calibration information for a respective input object, and the two-dimensional calibration information comprises calibration data for a respective individual location on the surface according to the bending response model;
    determine a location-based force estimate for each input object of the plurality of input objects by performing a linear solve using a one-dimensional vector obtained from the delta image and the plurality of flattened model force images corresponding to the plurality of touch input objects; and
    perform an action based on the force estimate of each input object of the plurality of input objects.

2. The processing system of claim 1, wherein each flattened model force image of the plurality of flattened model force images corresponds to a unique model force image for each cell of the sensing region.

3. The processing system of claim 2, wherein the unique model force image is generated by applying a model input object to a cell on the sensing region with a defined force to obtain a force value for each cell and normalizing the force value based on the defined force.

4. The processing system of claim 1, wherein the delta image comprises a force image and a positional image.

5. The processing system of claim 1, wherein
  performing the linear solve comprises using the plurality of flattened model force images with a raw force image obtained from the delta image.

6. The processing system of claim 1, wherein the delta image comprises a force image and a positional image, the positional image being separate in the delta image from the force image, wherein identifying the plurality of locations is from the positional image.

7. The processing system of claim 1, wherein the processing circuitry is further configured to:
  determine a curvature of the delta image at the plurality of locations in the delta image; and
  smooth the curvature at the plurality of locations a defined number of times to obtain a force image.

8. A method for multiple touch input object force estimation, comprising:
  obtaining a delta image of a sensing region on a surface using a plurality of sensor electrodes, wherein the surface is characterized by a bending response model representative of a distribution of non-uniform bending coefficients;
  identifying a plurality of touch locations of a plurality of touch input objects in the sensing region using the delta image;
  identifying a plurality of flattened model force images using the plurality of touch locations of the plurality of touch input objects, wherein each flattened model force image of the plurality of flattened model force images is a one-dimensional vector corresponding to a respective two-dimensional calibration information for a respective input object, and the two-dimensional calibration information comprises calibration data for a respective individual location on the surface according to the bending response model;
  determining a location-based force estimate for each input object of the plurality of input objects by performing a linear solve using a one-dimensional vector obtained from the delta image and the plurality of flattened model force images corresponding to the plurality of touch input objects; and
  performing an action based on the force estimate of each input object of the plurality of input objects.

9. The method of claim 8, wherein each flattened model force image of the plurality of flattened model force images corresponds to a unique model force image for each cell of the sensing region.

10. The method of claim 9, wherein the unique model force image is generated by applying a model input object to a cell on the sensing region with a defined force to obtain a force value for each cell, and normalizing the force value based on the defined force.

11. The method of claim 8, wherein the delta image comprises a force image and a positional image.

12. The method of claim 8,
  wherein performing the linear solve comprises using the plurality of flattened model force images with a raw force image obtained from the delta image.

13. The method of claim 8, wherein the delta image comprises a force image and a positional image, the positional image being separate in the delta image from the force image, wherein identifying the plurality of locations is from the positional image.

14. The method of claim 8, further comprising:
  determining a curvature of the delta image at the plurality of locations in the delta image; and
  smoothing the curvature at the plurality of locations a defined number of times to obtain a force image.

15. An input device for multiple touch input object force estimation, comprising:
  sensor circuitry configured acquire a plurality of touch force measurements of a sensing region on a surface using a plurality of sensor electrodes, wherein the surface is characterized by a bending response model representative of a distribution of non-uniform bending coefficients;
  processing circuitry connected to the sensor circuitry and configured to:
    obtain a delta image of the sensing region using the plurality of touch force measurements;
    identify a plurality of touch locations of a plurality of touch input objects in the sensing region using the delta image;
    identify a plurality of flattened model force images using the plurality of touch locations of the plurality of touch input objects, wherein each flattened model force image of the plurality of flattened model force images is a one-dimensional vector corresponding to a respective two-dimensional calibration information for a respective input object, and the two-dimensional calibration information comprises calibration data for a respective individual location on the surface according to the bending response model;

determine a location-based force estimate for each input object of the plurality of input objects by performing a linear solve using a one-dimensional vector obtained from the delta image and the plurality of flattened model force images corresponding to the plurality of touch input objects; and perform an action based on the force estimate of each input object of the plurality of input objects.

16. The input device of claim 15, wherein performing the linear solve comprises using the plurality of flattened model force images with a raw force image obtained from the delta image.

17. The input device of claim 15, wherein the processing circuitry is further configured to:

determine a curvature of the delta image at the plurality of locations in the delta image; and smooth the curvature at the plurality of locations a defined number of times to obtain a force image.

* * * * *

UNITED STATES PATENT AND TRADEMARK OFFICE
CERTIFICATE OF CORRECTION

PATENT NO. : 10,061,430 B2
APPLICATION NO. : 15/257969
DATED : August 28, 2018
INVENTOR(S) : Michael White et al.

Page 1 of 1

It is certified that error appears in the above-identified patent and that said Letters Patent is hereby corrected as shown below:

In the Claims

Claim 15, Column 20, Line 52, the word --to-- should be inserted between the words "configured" and "acquire".

Signed and Sealed this
Third Day of September, 2019

Andrei Iancu
*Director of the United States Patent and Trademark Office*